Patented Sept. 4, 1951

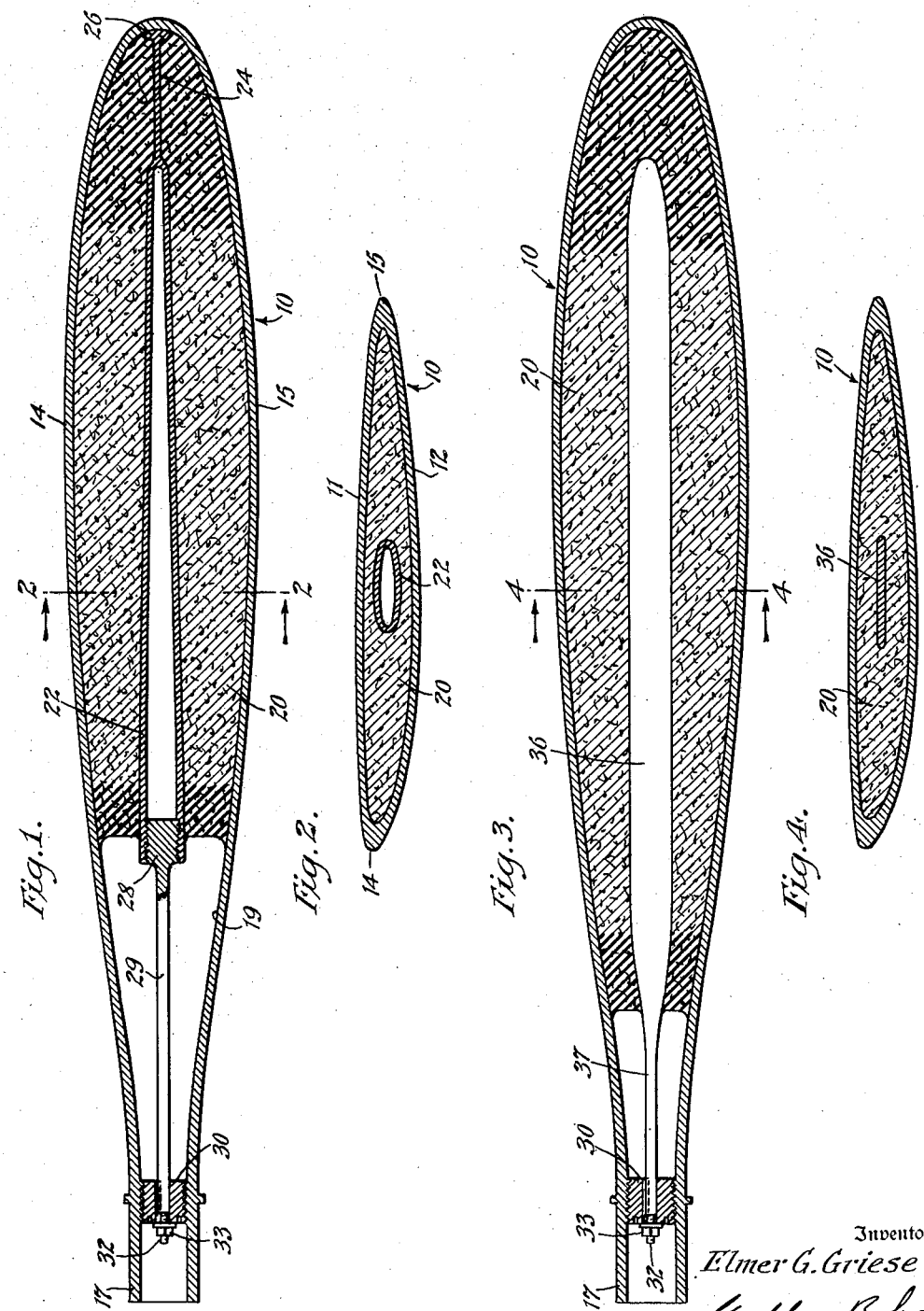

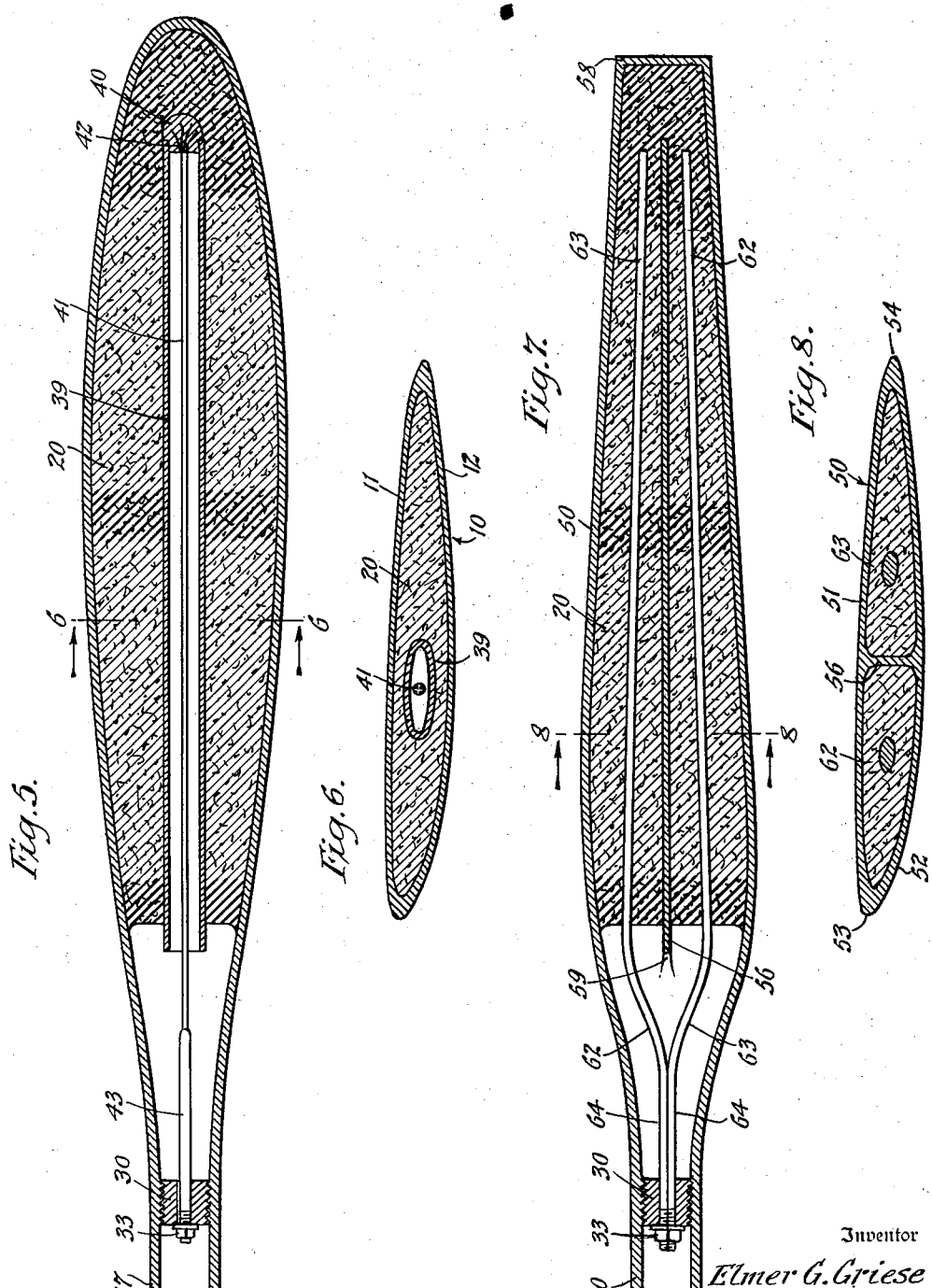

2,566,701

UNITED STATES PATENT OFFICE 2,566,701

REINFORCEMENT FOR FILLED HOLLOW STEEL BLADES

Elmer G. Griese, Caldwell, N. J., assignor to Curtiss-Wright Corporation, a corporation of Delaware Application October 23, 1946, Serial No. 705,154

4 Claims. (Cl. 170—159)

This invention concerns improvements in blades for aeronautical propellers and deals particularly with means for improving the vibration resistance of hollow metallic blades.

An object of the invention is to provide a vibration damping filler medium within the hollow of a propeller blade, and to provide independent means for supporting the filler material from the blade shank or root, against displacement due to centrifugal force. A further object of the invention is to provide vibration damping filler material in a hollow propeller blade and supporting means for the material, so arranged that the hollow metal shell of the blade need only sustain itself against centrifugal force, the added centrifugal loading resulting from the filler material being assumed by independent means within the propeller blade. A further object is to provide several alternative forms of blade filler reinforcements which lend themselves to different constructions of hollow metal propeller blades.

It has been proposed heretofore that hollow metal propeller blades, made for instance from steel, be so constructed that no extraneous support or reinforcement for such blades is necessary. In such blades, the blade shell is sufficiently strong and rigid so that it retains its airfoil profile during operation and assumes all of the loads imposed on it during flight, such as centrifugal loading and thrust and torque loading. It has been found at times, that such blades are subject to resonant vibrations which cause high stresses independent of the centrifugal and air loads which bring about a stress condition in the blades which is too high to be wholly safe. Such vibration may also cause deformation of the airfoil profiles of the blade to an extent which makes them aerodynamically less efficient than if their normal profile were maintained. To suppress resonant vibration tendencies, it has been proposed to fill such blades with a porous or cellular non-metallic material such as cork, expanded rubber or similar plastic materials. Such materials may be made rather light in weight and may have considerable damping effect on propeller vibration. Since the original blade shell is constructed with the utmost economy of material in order to reduce the blade weight, even the addition of the relative light filler material, effective for vibration suppression, may cause tension stresses in the blade which are objectionable; the filler material, operating in a centrifugal field, is compressed toward the tip of the blade and its effective weight is amplified many times by centrifugal force so that additional tensile stress may be placed upon the blade shell. This invention proposes to overcome this deficiency in blade filling technique by bonding the blade filler to a separate spine or member which extends longitudinally through the blade, and is secured to the blade only at its innermost portion, adjacent the blade shank. With the filler material bonded to such a spine, the centrifugal weight of the spine and filler material is imposed only upon the propeller hub and the innermost part of the blade shank, rather than upon the blade shell per se.

A better understanding of the details of the invention may be obtained by reading the annexed detailed description in connection with the drawings in which Fig. 1 is a longitudinal planform section through a hollow propeller blade embodying the features of this invention;

Fig. 2 is a section on the line 2—2 of Fig. 1;

Fig. 3 is an alternative arrangement of the invention shown as a longitudinal planform section;

Fig. 4 is a section on the line 4—4 of Fig. 3;

Fig. 5 is another alternative embodiment of the invention shown as a longitudinal planform section;

Fig. 6 is a section on the line 6—6 of Fig. 5;

Fig. 7 is another alternative embodiment of the invention shown in longitudinal planform section; and Fig. 8 is a section on the line 8—8 of Fig. 7.

The drawings and description are merely exemplary and it is to be understood that they do not define the limits of the invention, reference being had to the appended claims for this purpose.

Figs. 1 through 6 show a propeller blade of hollow metal construction, preferably steel, wherein 10 designates a hollow metal shell of airfoil section and blade planform, comprising a thrust plate 11 and a camber plate 12, the plates being integrally formed at their edges to form a leading edge 14 and a trailing edge 15. The blade shell blends at its inner end into a cylindrical shank portion 17 which is adapted for securement, in a manner well known in the art, to the blade socket of a propeller hub, not shown. The blade is usually mounted for pitch adjustment during flight as is well known. The shell 10 defines an interior hollow space 19, the radially outer part of which is filled with a light cellular material 20 which may be expanded natural or artificial rubber, cork, or some suitable plastic material. The material should have some mechanical strength and should be treated so as to become a more or less homogeneous mass, and it will be so chosen as to have vibration absorbing qualities to suppress vibration of the plates 11 and 12 during operation. The material need not necessarily fill the entire blade hollow but may, as shown in the figures, extend from the tip inwardly a distance of from ⅔ to ¾ of the blade length.

It would be appreciated that the blade filler material (of much lower modulus of elasticity than the blade shell material), if not reinforced, will have a tendency to crowd toward the blade tip during blade rotation due to centrifugal force. This tendency might tend to pull the material loose in the inner portions of the blade where it is bonded to the hollow shell, and also would impose greater centrifugal loading on the hollow steel shell than the shell would have to sustain if the filler material were not present.

In Figs. 1 and 2, I show one arrangement for reinforcing the filler material which comprises a flattened tapered tube 22 which is disposed along the longitudinal axis of the propeller blade within the shell 10, said tube, if desired, having a slim extension 24 at its outer end, the outer end of the extension initially resting lightly against the inner surface of the blade tip as at 26. This extension merely serves to locate the tube 22 during filling of the blade with the cellular material 20. The inner end of the tube 22 is provided with a threaded opening into which is screwed or otherwise secured a plug 28 formed on a tension rod 29 extending to the blade shank portion 17. A plug 30 is suitably secured in the blade shank 17 as by threading or other attachment, and the rod 29 extends through a bore in said plug. The innermost end of the rod may be threaded as at 32 and a nut 33 screwed thereon, to place initial tension in the rod 29 after the filling 20 has been installed. The blade assembly is treated, prior to tensioning of the rod 29, so that the filler material 20 will be firmly bonded to the exterior surface of the tube 22 and also, if preferred, to the inner surface of the blade shell 10. The pre-tensioning of the rod 29 serves to move part of the filler material 20 inwardly and to relieve the blade shell of support for the filler material during blade rotation. When the blade is rotating, the filler material will be supported largely by the tension rod 29 and tube 22 so that the blade shell is relieved of the additional centrifugal load that would otherwise be imparted to it by the filler material.

One of the objects of the invention, in providing a filler reinforcing member, is to construct the reinforcing member so that it will have maximum surface in contact with the filler material, to increase the bond strength between the filler material and the reinforcing member. In Figs. 3 and 4, I show a filler reinforcement member 36 in the form of a thin flat non-metallic or metal spine whose inner end is formed as a cylindrical tension rod 37. The spine 36 as shown in Fig. 4 lies substantially in the chordal plane of the propeller blade 10 and engages a substantial area of the filler material 20 which is bonded to the spine 36. If desired, the spine may be roughened or serrated to increase bonding area. After assembly of the spine 36 and the filler material 20 in the hollow blade 10 and appropriate bonding of the elements to one another, the spine 36 and its rod 37 may be placed in initial tension by tightening the nut 33 as previously described so that the centrifugal weight of the filler material is not imposed on the blade proper during operation.

In the arrangement of Figs. 5 and 6, the reinforcement for the filler 20 takes the form of a flattened tube 39, having considerable external surface area for bonding to the filler material. The tube 39 prior to installation in the blade is provided with a plug 40 at its outer end to which a tension rod or cable 41 is secured as at 42. Said rod 41 extends inwardly through the tube 39 and is secured, in the same manner as described previously, by a nut 33 threaded on an enlarged portion 43 of the tension rod, engaging the plug 30 secured in the blade shank 17.

In Figs. 7 and 8, I show a hollow steel blade 50 having thrust and camber plates 51 and 52 respectively, integral at their margins to form a leading edge 53 and a trailing edge 54. Intermediate the leading and trailing edges the thrust and camber plates are joined together by an integral internal rib 56, this rib extending from a point spaced inwardly from the blade tip 58 lengthwise of the blade to an inner end 59 which is outwardly spaced from the blade shank 60. This rib as is known in the art, provides greater strength and rigidity for the propeller blade and is applicable particularly when blades are of large size or of substantial width. When utilizing filler material 20 in a blade of this sort, the reinforcement of the filler material may be accomplished by utilizing two reinforcing rods 62 and 63 of appropriate cross sectional shape, each occupying a substantially central position in the leading half and in the trailing half of the propeller blade. These rods may be joined to one another at their inner ends, as at 64, to comprise a means for securing them jointly to the blade shank 60 as by a nut 33 bearing on a shank plug 30, in a manner similar to that previously described. In this construction, each mass of filler material 20 is reinforced and is supported as to centrifugal loading by the rods 62 and 63, relieving the blade shell 50 of such centrifugal loading.

The several embodiments of this invention permit the construction of a propeller blade which is lower in weight than comparable previous types of blades. Blades of the prior art frequently have had to be designed with sufficient metal mass in the outer shell to overcome the effects of vibration stress as well as to assume loading due to centrifugal force and thrust and torque. By minimizing stress due to vibration, it is possible to design a self-sustaining blade shell of lower weight than was possible heretofore. Centrifugal support of the filler material is accomplished by the spine members previously described which transmit tensile loading due to the centrifugal weight of the spines themselves and of the filler material directly to the blade shank, substantially relieving the propeller shell itself of centrifugal loading due to the filler. This allows an economy of weight, for if the centrifugal weight of the filler had to be assumed by the shell, the shell would necessarily be constructed somewhat heavier than otherwise. The increased thickness of shell material to support the filler against centrifugal loading produces a cumulative weight increment in the blade greater than that effected by the central reinforcing spine, for increased strength to support filler requires a further increase of blade thickness to support the blade weight increase.

In the drawing, the filler material crosshatching is shown as being denser in some parts than in other parts. This is to indicate that strata of filler may be used, whose density, natural vibration frequency or vibration absorbing ability (hysteresis) may be different in different parts of the blade. Such stratification may be spanwise as shown, and it also may be chordwise or normal-to-chord of the blade. Selection of material and the stratification pattern would be based on the vibration responses and characteristics of particular blade designs, in order to secure an absolute minimum weight of filler consistent with vibration absorption. For instance, little or no filler may be needed at vibration nodes in the blade, while material of high hysteresis, or alternately, elastic material having properties for changing resonant frequencies in the blade, could be disposed in vibration loop zones of the blade.

Though several embodiments illustrating the invention have been shown and described, it is to be understood that the invention may be applied in other and various forms. Changes may be made in the arrangements, without departing from the spirit of the invention. Reference should be had to the appended claims for definitions of the limits of the invention.

What is claimed is:

1. A propeller blade comprising a shank and a hollow metallic shell forming the predominant structural element of the blade, having airfoil profile and blade planform extending from said shank, a tubular member disposed in the shell hollow and out of contact with the shell walls, a lowstrength, low density material filling said shell and embracing said member, bonded to said member and in contact with said shell, and a tension tie securing said member to said shank, for holding the member and said filler material against outward movement due to centrifugal force during rotation of the blade in operation, said tension tie extending through said tubular member and being attached thereto at a point outwardly spaced from the inner end of the member.

2. A propeller blade comprising a hollow metallic shell forming the predominant structural element of the blade, having airfoil profile and blade planform and including an integral end shank for securement in a propeller hub, said shank providing the sole support for the blade shell, a metallic spine member extending into the hollow of said shell and free of mutually supporting engagement therewith, a cellular material, low in density compared to the density of the shell and spine material, at least partially filling said shell and bonded to said spine for support thereby, and an adjustable coupling between said spine member and said shank including means to pretension said spine member relative to said shell.

3. A propeller blade comprising a hollow metallic shell forming the predominant structural element of said blade having airfoil profile and blade planform and including an integral end shank for securement in a propeller hub, said shank providing the sole support for the blade shell, a metallic spine member extending into the hollow of said shell and free of mutually supporting engagement therewith, a material of low density and low modulus of elasticity as compared to the density of the shell and spine materials at least partially filling said shell and bonded to said spine for support thereby, a boss secured within said shank through which a portion of said spine member passes, and means engaging said spine member portion and said boss adjustable to draw said spine member portion through said boss, and said spine member toward said boss, to exert tension on said spine member.

4. A propeller blade comprising a hollow metallic self-supporting shell provided at one end with an integral substantially cylindrical hollow shank adapted to be secured within the hub of a propeller, said blade being of such strength, thickness and mass as to withstand the steady state loading imposed thereon during propeller operation including centrifugal, thrust and torque loading, a low strength, low density, vibration absorbent material of rubber or the like within and occupying at least a part of the hollow of said blade shell and having intimate contact with the inner surfaces thereof to damp displacements of portions of said blade shell due to vibration, a metallic spine extending longitudinally within said blade, through said shank, into the shell hollow, means to secure the shank end of said spine adjustably to and within said shank, said spine passing through and into said absorbent material and having a substantial area in contact therewith and bonded thereto, said spine floating within and clear of contact with the blade shell except at its securement within said shank, and means forming part of said spine securing means to place said spine in tension within said blade and to displace said absorbent material towards said shank.

ELMER G. GRIESE.

REFERENCES CITED

The following references are of record in the file of this patent:

UNITED STATES PATENTS

| Number | Name | Date |
|---|---|---|
| 2,378,059 | Brauchler | June 12, 1945 |
| 2,406,471 | McKee | Aug. 27, 1946 |
| 2,423,700 | Hardy | July 8, 1947 |
| 2,428,970 | Hardy | Oct. 14, 1947 |

FOREIGN PATENTS

| Number | Country | Date |
|---|---|---|
| 124,253 | Great Britain | Mar. 13, 1919 |
| 551,140 | Great Britain | Feb. 9, 1943 |